Feb. 23, 1937.  E. M. FRASER  2,071,943
ELECTROMAGNETIC CLUTCH
Filed April 16, 1934  4 Sheets-Sheet 1
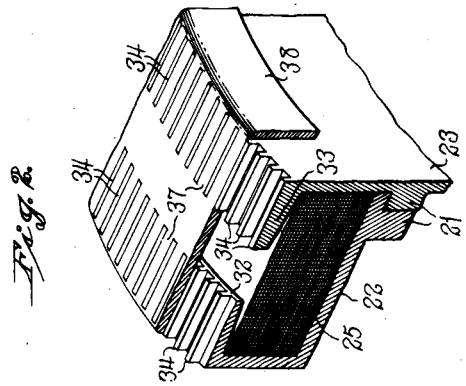
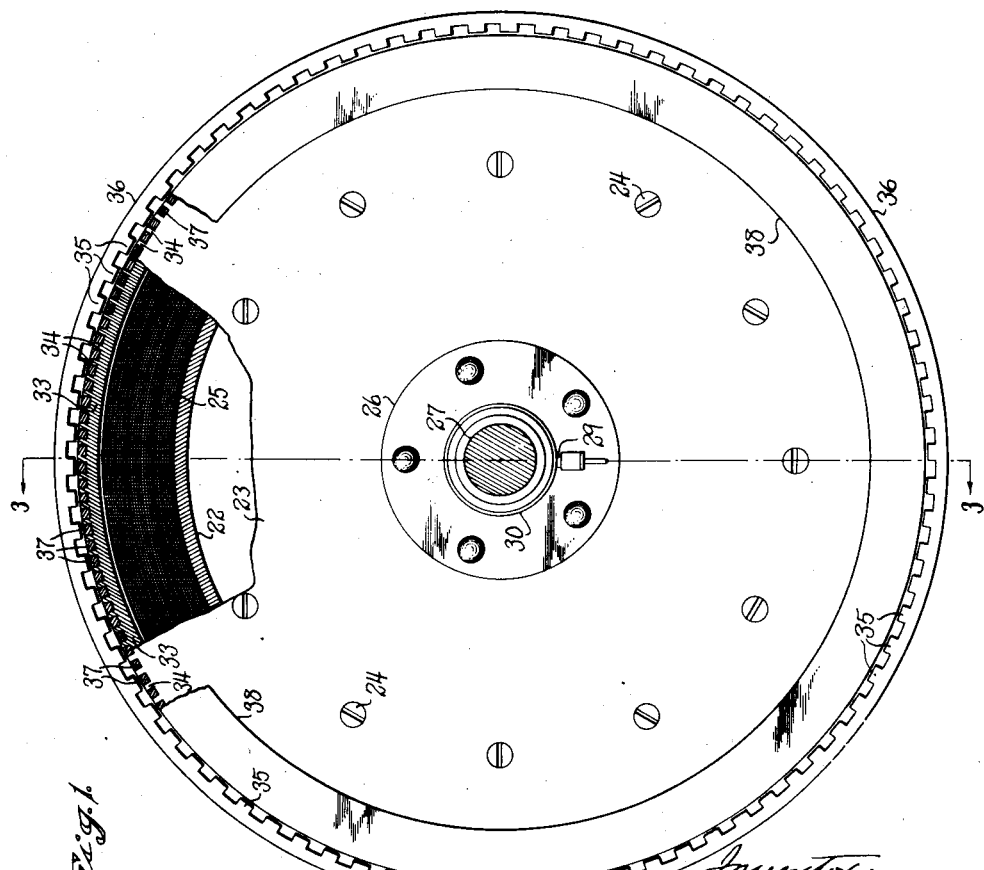

Feb. 23, 1937.  E. M. FRASER  2,071,943
ELECTROMAGNETIC CLUTCH
Filed April 16, 1934  4 Sheets—Sheet 2
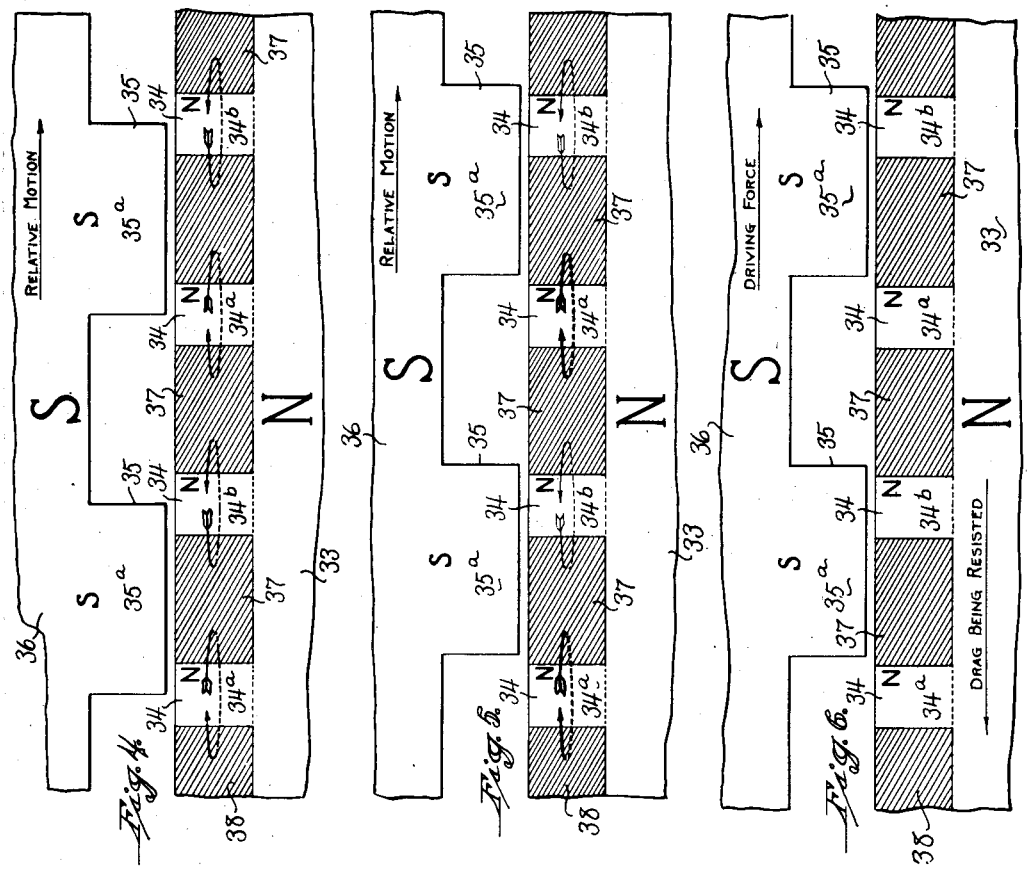
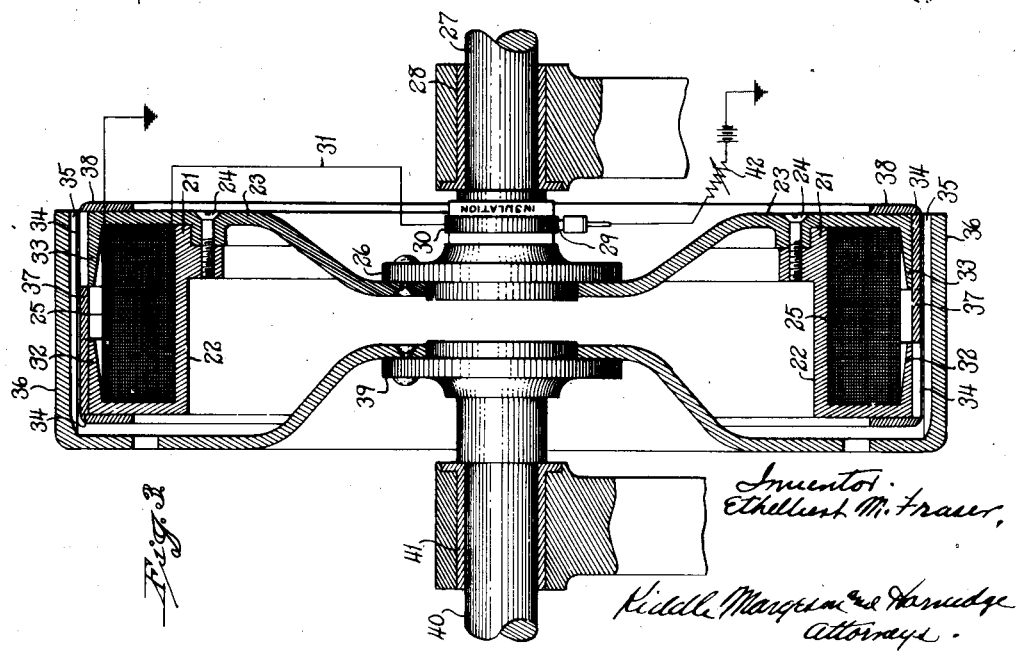

Feb. 23, 1937. E. M. FRASER 2,071,943
ELECTROMAGNETIC CLUTCH
Filed April 16, 1934 4 Sheets-Sheet 3
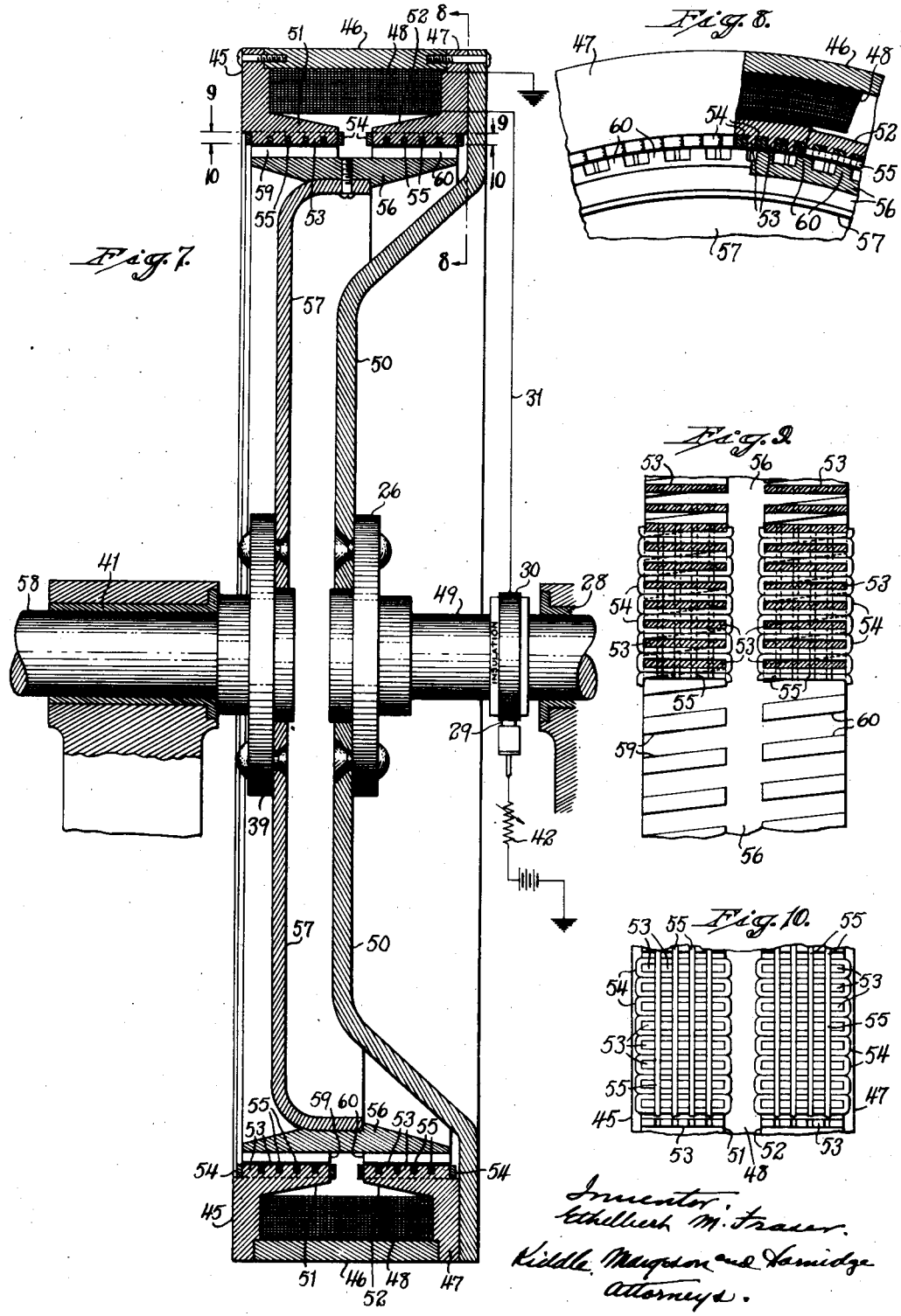

Feb. 23, 1937.　　　　E. M. FRASER　　　　2,071,943
ELECTROMAGNETIC CLUTCH
Filed April 16, 1934　　　　4 Sheets-Sheet 4
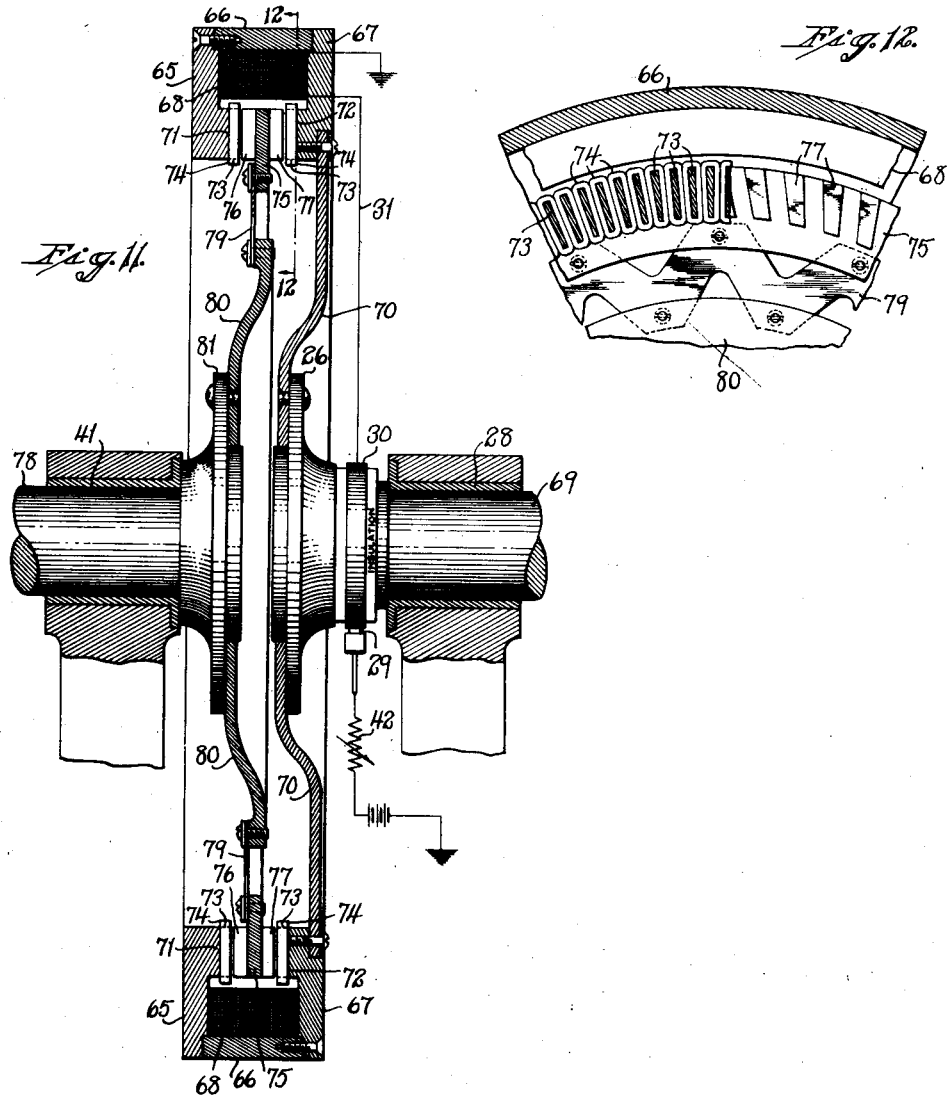

Patented Feb. 23, 1937

2,071,943

UNITED STATES PATENT OFFICE 2,071,943

ELECTROMAGNETIC CLUTCH

Ethelbert M. Fraser, Yonkers, N. Y., assignor to Fraser Automotive Appliances, Inc.

Application April 16, 1934, Serial No. 720,718

24 Claims. (Cl. 172—284)

This invention relates to an improvement in clutches for coupling two relatively rotary elements together, such, for instance, as an automobile engine and an automobile drive-shaft, and relates more in particular to electromagnetic clutches.

One of the objects of the present invention is to provide a superior electromagnetic clutch having capacity for smoothly and effectively coupling two elements together.

A further object is to provide a superior electro-magnetic clutch in which the magnetic reluctance between the two relatively-rotatable units thereof is substantially constant to thereby avoid unintentional variations in the coupling action of the clutch.

Another object is to provide a superior electromagnetic clutch which will not only serve to bring two relatively-rotatable elements smoothly into synchronism, but will maintain the same in interlocked relationship, once synchronism has been reached.

A still further object is to provide a superior electromagnetic clutch in which objectionable "hunting" between the relatively-rotatable units thereof is substantially eliminated.

Another object is to provide a superior electromagnetic clutch combining effective coupling action and low current consumption.

Other objects and advantages will appear to those skilled in the art from the following, considered in conjunction with the accompanying drawings and the appended claims.

In use, as will more fully appear from the following, both members or units of the clutch are mounted with capacity for rotation with respect to each other and with respect to a fixed point, such as the supporting-means. An energizing-coil or winding is employed for energizing the magnet unit of the clutch, and it is to be understood that the current supply to this coil or winding will be controlled by any suitable device, whereby the current supplied to the winding may be varied at will.

In the accompanying drawings:

Fig. 1 is a face view, partly in elevation and partly in section, of one form which an electromagnetic clutch embodying the present invention may assume;

Fig. 2 is a broken perspective view of a part of the magnet unit shown partly in section;

Fig. 3 is a transverse sectional view taken on the line 3—3 of Fig. 1;

Fig. 4 is a schematic view illustrating the effects of the subsidiary currents generated in the short-circuiting grid surrounding the teeth or salient-poles of the magnet unit;

Fig. 5 is a similar view showing the parts slightly shifted with respect to each other;

Fig. 6 is a similar view illustrating the condition when the magnet unit and the armature unit are rotating together in synchronism;

Fig. 7 is a view mainly in central transverse section illustrating another form which a clutch embodying the present invention may assume;

Fig. 8 is a fragmentary view shown partly in section on the line 8—8 of Fig. 7;

Fig. 9 is a fragmentary sectional view taken on the line 9—9 of Fig. 7;

Fig. 10 is a similar view taken on the line 10—10 of Fig. 7;

Fig. 11 is a central sectional view of the same type as Figs. 3 and 7, illustrating still another form which an electromagnetic clutch may assume in accordance with the present invention;

Fig. 12 is a fragmentary sectional view taken on the line 12—12 of Fig. 11.

The particular embodiment of the present invention herein chosen for illustration in Figs. 1 to 3, inclusive, includes an electromagnet frame generally designated by the numeral 21, and comprising two members 22 and 23 formed of magnetic material, such as soft iron, and normally rigidly secured together by suitable fastening means, such as screws 24, but made separately to permit the installation between them of a ring-like energizing-coil or winding 25.

The member 23 of the electromagnet frame 21 is mounted concentrically upon the flange-head 26 of a shaft 27 mounted with capacity for rotation in a suitable bearing, such as 28.

Current is supplied to the coil 25 by providing a brush 29 bearing against a collector-ring 30 secured to the shaft 27 and suitably insulated therefrom. The said collector-ring 30 is connected by a wire 31 to one terminal of the coil 25, the opposite terminal of which latter is suitably grounded as indicated.

The electromagnet frame, which substantially encloses the coil 25, provides two complementary, annular, inwardly-projecting poles 32 and 33, each of which is formed upon its outer face with teeth or salient polar-projections 34 extending parallel with the axis of the electromagnet unit comprising, in the main, the members 22, 23, and the coil 25.

For the purpose of clarity of description, the teeth 34 just above referred to may be properly designated as "minor-extent" teeth for the reason that they are of a lesser pitch and have less facial extent in the direction of relative rotation between the units of the clutch, than the teeth or salient polar-projections 35 of an armature unit 36 with which they cooperate. The latter teeth 35 of the said armature 36 may, therefore, by comparison with the teeth 34, be designated as "major-extent" teeth or salient polar-projections, for the reason that they are of greater pitch and are of greater facial extent in a direction circumferentially of the device than the minor-extent teeth 34, with which they cooperate. The effect of the relationship between the minor-extent and major-extent teeth will be more fully hereinafter described.

By reference to Fig. 3 in particular, it will be seen that the major-extent teeth 35 of the armature 36 are of sufficient length in a direction parallel with the axis of the device to overlie both sets of minor-extent teeth 34 of the respective poles 32 and 33 of the electromagnet unit. The minor-extent teeth 34 of each of the poles 32 and 33 are surrounded laterally by electroconductive means 37 formed by providing a suitably punched grid or band 38 of copper or other suitable material fitting over the said minor-extent teeth and providing each thereof with a local electric circuit laterally surrounding the same, as will clearly appear by reference to Figs. 4 to 6, inclusive.

The armature 36 is concentrically mounted upon a flange-head 39 forming a feature of a shaft 40 mounted with freedom for rotation in a suitable bearing, such as 41, and positioned coaxially with respect to the shaft 27 of the electromagnet unit before referred to.

For the purpose of convenience of description, let it be presumed that the shaft 40 is rotating under the driving force of an automobile engine, for instance, and that the complementary shaft 27 is connected to the drive-shaft of an automobile or other element which it is desired to drive. With the armature member rotating, it is desired to cause the shaft 27 to rotate, and this may be accomplished by supplying current to the coil 25 of the electromagnet unit by operating a suitable control, such, for instance, as a rheostat 42. As the coil 25 is thus energized, it will generate magnetic flux in the poles 32 and 33, which flux will be conveyed from one pole to the other by the teeth 35 of the armature 36, with the effect of causing a coupling action between the said armature and the electromagnet unit, which, when sufficient current has been supplied to the coil 25, will serve to firmly interlock the drive-shaft 40 and the driven-shaft 27 for rotation as a unit.

Preferably and as shown particularly well in Figs. 1 and 4 to 6, inclusive, the minor-extent teeth 34 have a pitch twice that of the major-extent teeth 35. In other words, the major-extent teeth 35 may be said to have a pitch-width or facial extent equal to the pitch-width of one of the minor-extent teeth 34 plus the gap between the latter and an adjacent minor-extent tooth. As thus proportioned, each major-extent tooth forms a magnetic bridge between two immediately adjacent minor-extent teeth of a given set thereof, of such span that, as relative motion takes place between the armature unit and the electromagnet unit, the overlap of a given major-extent tooth decreases with respect to one of the minor-extent teeth at the same time and to the same degree that its overlap increases with respect to an immediately-adjacent one of the said minor-extent teeth, as will be clearly seen by reference to Figs. 4 to 6, inclusive, whereby a magnetic path of substantially uniform capacity or reluctance is provided between the armature unit and the electromagnet unit for the passage of what might be termed the "main" flux generated by the coil 25.

It may be explained in this connection that changes in the reluctance or flux-conducting capacity of the flux path between a toothed electromagnet member and a toothed armature member (when one or the other of said members has short-circuiting means around its teeth) as relative motion takes place, serves to set up what is commonly referred to as "armature reaction", which, in turn, periodically bucks the main magnetic flux generated by the energizing coil and decreases the efficiency thereof, even to the point where the coupling action between the members entirely ceases. The proportioning of the parts, to secure the uniform reluctance feature above referred to, serves to almost entirely prevent armature reaction from the flux generated by the coil 25. In the foregoing, the function of the high-electroconductive paths around each minor-extent tooth afforded by the copper grid 38, has been temporarily ignored, but will now be considered.

In accordance with the recognized operation of electromagnetic laws, it is known that when a flux path is contracted (i. e., the reluctance increased), an electric conductor encircling such flux path will have induced in it currents of such direction as will create magnetomotive forces tending to maintain the original flux. Similarly, at a point where the flux path is being expanded (i. e., the reluctance decreased), an electric conductor encircling the flux path in question will have induced in it currents of such direction as will create magnetomotive forces which will exert an effort at this point also to preserve the reduced flux.

The manner in which the present structure takes advantage of the electromagnetic laws before referred to, may be best understood by reference to the schematic views of Figs. 4 to 6, inclusive.

Let it be presumed for purpose of description that relative motion is taking place between the armature unit and the electromagnetic unit, and that the coil 25 is energized to impress north polarity upon the minor-extent teeth 34, shown in Figs. 4 to 6, inclusive, and at the same time to impress south polarity upon the major-extent teeth 35 of the armature 36.

In the following description of the interaction between a single major-extent tooth on one hand and two immediately adjacent minor-extent teeth on the other hand, it is to be borne in mind that the same action takes place between each and every one of the other series of major-extent teeth and an adjacent pair of minor-extent teeth.

As motion takes place between the parts from the position in which they are shown in Fig. 4, the flux path between the trailing edge of the major-extent tooth 35$^a$ and the left-end minor-extent tooth 34$^a$ will be contracted (i. e., reluctance increased), and thus induce in the portion of the copper grid 38 surrounding the latter, current of such direction as will create magnetomotive force which will be added to that of the main flux and correspondingly increase the resistance to the motion referred to. In other words, the current induced in the portion of the grid 38 surrounding the minor-extent tooth 34$^a$ will act to boost the magnetomotive force to markedly increase the coupling action between the armature and electromagnet members.

At the same time and to a corresponding degree, the motion between the parts will also serve to expand the flux path (i. e., decrease the reluctance) between the forward portion of the major-extent tooth 35ª and the right-hand minor-extent tooth 34ᵇ, and thus induce in that portion of the grid surrounding the latter, a current of such direction as will reduce the magnetomotive force to markedly reduce the pull-ahead effect between the armature and electromagnet members. It must be borne in mind in this connection that at the same time and to substantially the same degree that the magnetomotive force surrounding the tooth 34ᵇ is being reduced, as just described, the magnetomotive force surrounding the tooth 34ª is being to an equal degree accentuated or boosted.

When the armature member reaches the position shown in Fig. 5 with reference to the electromagnet member, the flux at the trailing edge of the major-extent tooth 35ª and the adjacent edge of the minor-extent tooth 34ª will be very dense and flowing in an oblique direction and when it is borne in mind that the resistance to relative motion varies with variation in the flux angle and as the square of the flux density, the coupling action is very marked. As more current is supplied to the coil 25 the magnetic grip between the armature and the electromagnet member will ultimately be sufficient to couple them together for rotation as a unit, whereupon, of course, all relative motion between the two said members ceases, and the copper grid 38 ceases to function. The parts under this latter condition are represented in Fig. 6.

When the parts are rotating as a unit, as above described, the copper grid ceases to function as stated, but owing to the density and angularity of the flux passing between the trailing edge of the major-extent tooth 35ª and the adjacent edge of the minor-extent tooth 34ª, the holding power at this point would be sufficient to maintain the parts in coupled relationship.

In the clutch structure shown in Figs. 7 to 10, inclusive, the electromagnet unit comprises three frame members of magnetic material 45, 46 and 47, substantially surrounding an energizing coil 48 and attached centrally to a shaft 49 by a dished plate 50.

The frame members 45 and 47, respectively, provide annular poles 51 and 52 located interiorly of the coil 48 and hence in the densest flux generated by the said coil. Each of the said poles 51 and 52 is provided upon its inner face with an annular series of minor-extent teeth 53 extending substantially parallel with the axis of the clutch and grooved in a circumferential direction to divide each of said teeth 53 into five (more or less) subdivisions. Each of the said minor-extent teeth 53 is laterally encircled by a loop 54 of copper or other material of low electrical resistance. Each of the said loops 54 is grooved on its inner face in line with the grooves in the teeth 54 and receives copper or equivalent bars 55 which thus serve, together with the loops 54, to provide an electrical path of high conductivity around each subdivision of the minor-extent teeth 53.

Located inside of the electromagnetic member is an armature 56 of magnetic material, attached by a cup-shaped plate 57 to a shaft 58 suitably journaled for rotation concentrically with respect to the shaft 49, before referred to.

The outer periphery of the armature 56 is provided with two annular sets of major-extent teeth 59 and 60, respectively, and cooperating with the minor-extent teeth 53 of the poles 51 and 52 of the electromagnet unit. The minor-extent teeth 59 and 60, just referred to, instead of extending substantially parallel with the axis of the clutch, are obliquely disposed with respect thereto, as will clearly appear by reference to Fig. 9.

The operation of the clutch structure illustrated in Figs. 7 to 10, inclusive, is substantially the same as that described for the preceding figures. By locating both the major and minor-extent teeth within the energizing coil 48, the efficiency of the clutch is very materially increased over that which would be the case were the said teeth located outside the said coil.

Referring now to the clutch or coupling structure shown in Figs. 11 and 12, the electromagnet member comprises casing members 65, 66 and 67, enclosing an energizing coil 68 and rigidly attached by means of a plate 70 to a shaft 69 suitably journaled for rotary movement.

The inner terminal of each of the frame members 65 and 67 provides poles 71 and 72, each of which is provided with an annular series of minor-extent teeth 73, each set of which faces toward the other and extends lengthwise substantially radially of the axis of the clutch. Each minor-extent tooth 73 is, as shown, laterally encircled by a loop 74 of copper or other suitable material.

Positioned between the opposed sets of minor-extent teeth of the respective poles 71 and 72 is an armature 75 formed of magnetic material and provided on each of its opposite faces with an annular series of major-extent teeth 76 and 77, extending in a general radial direction, but obliquely or tangentially with respect to the minor-extent teeth 73 of the electromagnet member.

The armature 75 is secured to a shaft 78 suitably joined concentrically with respect to the shaft 69, by a skeletonized flexible plate 79 which is attached at its outer end to the said armature and at its inner end to a relatively-rigid hub-plate 80, riveted or otherwise secured to a flange head 81 constituting a feature of the shaft 78.

It is desirable in a clutch structure to have the coupling effect during the relative movement between the armature and electromagnet member build up in a substantially straight line as more current is supplied to the energizing coil, and ultimately effect the actual interlocking of the parts for concurrent rotation at the peak of the coupling effect.

I have found that the definite locking effect between the magnet and armature may be varied as desired, by varying the slope of the major-extent teeth with respect to the minor-extent teeth within considerable limits.

Throughout the above description, the minor-extent teeth have been described as being provided with short-circuiting loops or the like, and as being located on the electromagnet member rather than upon the armature, which latter has been described as having the major-extent teeth. I wish to have it understood, however, that this arrangement may be reversed without departing from the inventive concept of the present invention.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

What I claim is:—

1. An electromagnetic clutch comprising in combination a magnet with toothed circular poles, a toothed magnetic armature for the said magnet, each of said members being rotatable with respect to the other and with respect to a fixed point, a pole of one of said members having twice as many teeth as the cooperating pole of the other member.

2. An electromagnetic clutch comprising in combination a magnet, a magnetic armature therefor disposed in cooperative relation thereto, each of said members being rotatable with respect to the other, a coil for energizing the magnet thereby to effect rotation of the two members as a unit, said armature and said magnet being toothed, the width of each tooth of one member being substantially equal to the pitch of the teeth on the other of said members.

3. An electromagnetic clutch comprising in combination a circular magnet provided with a double set of poles, the said poles being toothed or serrated, an energizing winding for said magnet, an armature unit for said magnet member also having a double set of poles respectively cooperating with the double set of poles of the said magnet, the number of teeth on a pole of one of said members being twice the number of teeth on the cooperating pole of the other of said members, and short circuiting means surrounding the teeth of the one of said members having the greater number of teeth, each of said members being rotatable with respect to the other and with respect to a fixed point.

4. An electromagnetic clutch comprising in combination a magnet with toothed poles, a toothed magnetic armature for said magnet, each of said members being rotatable with respect to the other and with respect to a fixed point, the teeth on one of said members being disposed at an angle to the teeth on the other of said members, a pole of one member having twice as many teeth as the cooperating pole of the other member, the first mentioned teeth being divided into a plurality of divisions each of which is surrounded by short circuiting means.

5. An electromagnetic clutch comprising in combination a magnet having a plurality of toothed circular poles, a toothed magnetic armature for said magnet, each of said members being rotatable with respect to the other and with respect to a fixed point, the number of teeth on a pole of one of said members being twice the number of teeth on the cooperating pole of the other of said members, the said teeth being so arranged that the magnetic reluctance between the said members is substantially constant, and means for energizing said magnet.

6. An electromagnetic clutch comprising in combination a magnet having a plurality of toothed circular poles, a toothed magnetic armature for said magnet, each of said members being rotatable with respect to the other and with respect to a fixed point, the number of teeth on a pole of one of said members being twice the number of teeth on the cooperating pole of the other of said members, the said teeth being so arranged that the magnetic reluctance between the said members is substantially constant, means for energizing said magnet, and short-circuiting means surrounding the teeth of the one of said members having the greater number of teeth.

7. An electromagnetic clutch comprising in combination a magnet having toothed circular poles, a toothed magnetic armature for said magnet, the teeth on one of said members being angularly disposed with respect to the teeth on the other of said members, both of said members being rotatable with respect to each other and with respect to a fixed point, the number of teeth on a pole of one of said members being twice the number of teeth on the cooperating pole of the other of said members, and means for energizing said magnet.

8. An electromagnetic clutch comprising in combination a magnet with toothed circular poles, a toothed magnetic armature for said magnet, the teeth on one of said members being angularly disposed at an angle to the teeth on the other of said members, each of said members being rotatable with respect to the other and with respect to a fixed point, a pole of one member having twice as many teeth as the cooperating pole of the other member, and a winding for said magnet surrounding said members.

9. An electromagnetic clutch comprising in combination a circular magnet having toothed circular poles, a toothed magnetic armature for said magnet, each of said members being rotatable with respect to the other and with respect to a fixed point, the teeth on one of said members extending substantially parallel to its axis of rotation, the teeth on the other of said members extending at an angle to said axis of rotation, the number of teeth on a pole of one of said members being twice the number of teeth on the cooperating pole of the other of said members, and a winding for said magnet.

10. An electromagnetic clutch comprising in combination a circular electromagnet provided with toothed poles, a ring armature therefor lying between said toothed poles, each of said members being rotatable with respect to the other and with respect to a fixed point, said ring armature being toothed on each face, the teeth of the armature cooperating with the teeth of the poles of the magnet, and a flexible plate for supporting said armature.

11. An electromagnetic clutch comprising in combination a circular electromagnet provided with toothed poles, a ring armature therefor lying between said toothed poles and provided with teeth on each face, each of said members being rotatable with respect to the other and with respect to a fixed point, the teeth on the faces of the armature being disposed at an angle to the teeth on the poles of the magnet, and means for energizing the magnet surrounding the poles of the magnet and said armature.

12. An electromagnetic clutch comprising in combination a circular electromagnet provided with toothed poles, a circular armature therefor disposed between the toothed poles of the magnet, each of said members being rotatable with respect to the other and with respect to a fixed point, the teeth on each face of said armature disposed at an angle to the teeth on the poles of the magnet, means for energizing the magnet surrounding the said toothed poles and said armature, and a flexible plate for supporting said armature.

13. An electromagnetic clutch including in combination an electromagnetic member having circular poles with projections or teeth, an armature member also having polar projections or teeth cooperating with the pole projections of the said electromagnetic member for conducting the magnetic flux generated by the latter, each of said members being rotatable relative to the other and relative to a fixed point, the polar projections of one of said members being of major width circumferentially as compared to the polar projections of the other of said members, the width of each of said first mentioned polar projections circumferentially being substantially equal to the pitch of the second mentioned polar projections.

14. An electromagnetic clutch including in combination an electromagnetic member having circular poles with projections or teeth, an armature member also having polar projections or teeth cooperating with the polar projections of the said electromagnetic member for conducting the magnetic flux generated by the latter, each of the said members being rotatable relative to the other, the polar projections of one of said members being parallel to its axis of rotation, the other polar projections being at an angle thereto, the polar projections of one of said members being of major width circumferentially as compared to the polar projections of the other of the said members, the width of each of said first-mentioned polar projections circumferentially being substantially equal to the pitch of the second mentioned polar projections.

15. An electromagnetic clutch including in combination an electromagnetic member having circular poles with projections or teeth, an armature member also having polar projections or teeth cooperating with the polar projections of the said electromagnetic member for conducting the magnetic flux generated by the latter, each of the said members being rotatable relative to the other, the polar projections of one of said members being of major pitch width as compared to the polar projections of the other of the said members, which are of minor pitch width, electroconductive means around the said minor width polar projections, the said major width polar projections each having a width substantially equal to the width of one of said minor width polar projections plus the width of the space therebetween.

16. An electromagnetic clutch including in combination an electromagnetic member having circular poles with projections or teeth, an armature member also having polar projections or teeth cooperating with the polar projections of the said electromagnetic member for conducting the magnetic flux generated by the latter, each of the said members being rotatable relative to the other, the polar projections of one of said members being substantially parallel to the axis of rotation of the said members, the other polar projections being disposed at an angle thereto, the polar projections of one of said members being of major pitch width as compared to the polar projections of the other of the said members, which are of minor pitch width, electroconductive means around the said minor width polar projections, the said major width polar projections each having a width substantially equal to the width of one of said minor width polar projections plus the width of the space therebetween.

17. An electromagnetic clutch including in combination an electromagnetic member having circular poles with projections or teeth, a magnetic armature member also having polar projections or teeth cooperating with the polar projections of the said electromagnetic member for conducting the magnetic flux generated by the latter, each of the said members being rotatable relative to the other, the polar projections of one of said members extending diagonally with respect to the polar projections of the other member, the polar projections of one of said members being of major facial extent as compared to the polar projections of the other of said members, which are of minor facial extent, the said major extent and minor extent polar projections being proportioned relative to each other to provide a magnetic path of substantially uniform reluctance between the two said members at substantially all positions of relative movement therebetween, and short-circuiting electroconductive means extending around the said minor extent polar projections to create therein secondary magnetic forces of such polarity as to oppose the relative movement referred to.

18. An electromagnetic clutch including in combination an electromagnetic member having circular poles with projections or teeth, a magnetic armature member also having polar projections or teeth cooperating with the polar projections of the said electromagnetic member, each of the said members being rotatable relative to the other, the polar projections of one of said members being of major facial extent as compared to the polar projections of the other of said members, which are of minor facial extent, the said major extent poles being so proportioned that a given one thereof provides a magnetic bridge between two of the said minor extent poles of such span as to contract the flux path between itself and one of said minor extent poles at the same time and to substantially the same degree that it expands the flux path between itself and the other of said minor extent poles.

19. An electromagnetic clutch including in combination an electromagnetic member having circular poles with projections or teeth, a magnetic armature member also having polar projections or teeth cooperating with the polar projections of the said electromagnetic member, each of the said members being rotatable relative to the other, the polar projections of one of said members being of major facial extent as compared to the polar projections of the other of said members, which are of minor facial extent, the said major extent poles being so proportioned that a given one thereof provides a magnetic bridge between two of the immediately adjacent minor extent poles of such span as to contract the flux path between itself and one of said minor extent poles at the same time that it expands the flux path between itself and the other of the said immediately adjacent minor extent poles.

20. An electromagnetic clutch including in combination an electromagnetic member having polar projections or teeth, a magnetic armature member having circular poles with projections cooperating with the polar projections of the said electromagnetic member, each of the said members being rotatable relative to the other, the polar projections of one of said members being of major facial extent as compared to the polar projections of the other of said members, which are of minor extent, the said major extent poles being so proportioned that a given one thereof provides a magnetic bridge between two of the immediately adjacent minor extent poles of such span as to contract the flux path between itself and one of said minor extent poles at the same time and to substantially the same degree that it expands the flux path between itself and the other of said immediately adjacent minor extent poles.

21. An electromagnetic clutch including in combination an electromagnetic member having circular poles with projections or teeth, an armature member also having polar projections or teeth cooperating with the polar projections of the said electromagnetic member, each of the said members being rotatable relative to the other, the polar projections of one of said members being of major pitch width as compared to the polar projections of the other of the said members, which are of minor pitch width, the said major width polar projections being so proportioned that a given one thereof provides a magnetic bridge between two of the said minor width poles of such extent as to contract the flux path between itself and one of said minor width poles at the same time and to substantially the same degree that it expands the flux path between itself and the other of said minor width poles.

22. An electromagnetic clutch including in combination an electromagnetic member for generating a main magnetic flux and having circular poles with projections or teeth, a magnetic armature member also having polar projections or teeth cooperating with the polar projections of the said electromagnetic member, each of said members being rotatable relative to the other, the polar projections of one of said members being of major facial extent as compared to the polar projections of the other of said members, which are of minor facial extent, electroconductive means extending around said minor extent polar projections, the said major extent polar projections being so proportioned that a given one thereof provides a magnetic bridge between two of the said minor extent polar projections of such span as to contract the flux path between itself and one of said minor extent polar projections at the same time and to substantially the same degree that it expands the flux path between itself and the other of said minor extent polar projections, whereby upon relative movement between said members the electroconductive means around said minor extent polar projections will induce in the latter secondary magnetic forces of such polarity as will reinforce the main magnetic flux in the said minor extent polar projections with respect to which the flux path is being contracted and oppose the said main magnetic flux at the minor extent polar projection with respect to which the flux path is being expanded.

23. An electromagnetic clutch including in combination an electromagnetic member for generating a main magnetic flux and having circular poles with projections or teeth, a magnetic armature member also having polar projections or teeth cooperating with the polar projections of the said electromagnetic member, each of said members being rotatable relative to the other, the polar projections of one of said members being of major pitch width as compared to the polar projections of the other of said members, which are of minor pitch width, the major pitch width projections extending at an angle with respect to the axis of rotation of the rotatable member, the minor pitch width projections extending parallel to the same axis, short-circuiting electroconductive means extending around the said minor width polar projections, the said major width polar projections being so proportioned that a given one thereof provides a magnetic bridge between two of the said minor width polar projections of such extent as to contract the flux path between itself and one of said minor width polar projections at the same time and to substantially the same degree that it expands the flux path between itself and the other of said minor width polar projections, whereby upon relative movement between said members the electroconductive means around said minor width polar projections will induce in the latter secondary magnetic forces of such polarity as will reinforce the main magnetic flux in the minor width polar projection with respect to which the flux path is being contracted and oppose the said main magnetic flux at the minor width polar projection with respect to which the flux path is being expanded.

24. An electromagnetic clutch comprising in combination a toothed circular magnet, an energizing winding for the said magnet and supported thereby, short circuiting means surrounding the teeth of the said magnet and substantially filling the spaces between the said teeth, a toothed circular armature for the said magnet, the teeth thereof coacting with the teeth of the said magnet, the teeth of said members being so arranged that in every relative position of the magnet and armature the center lines of some of the teeth of one of said members are out of alignment with the center lines of the coacting teeth of the other of said members.

ETHELBERT M. FRASER.